United States Patent Office 3,275,356
Patented Sept. 27, 1966

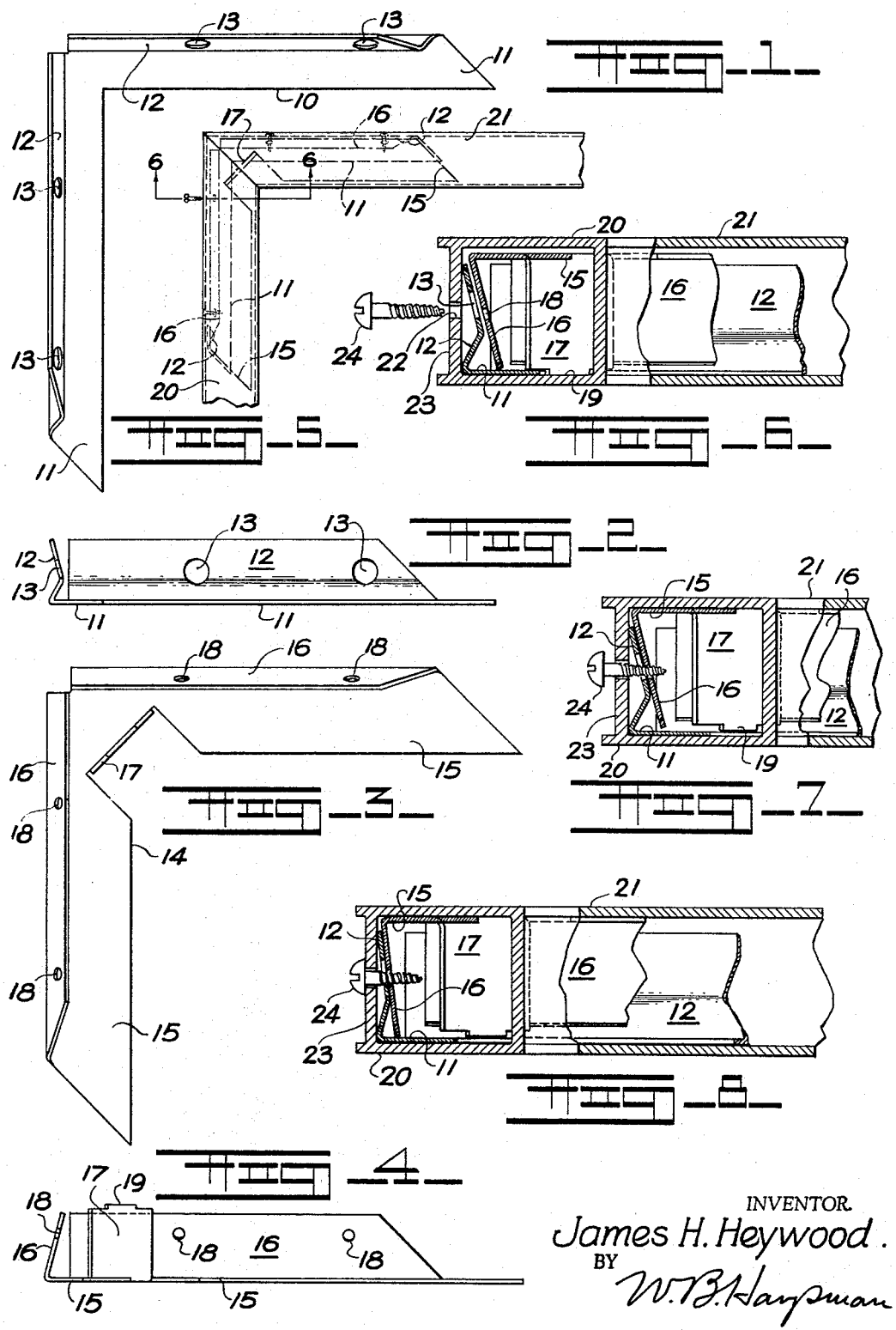

3,275,356
CORNER FASTENER FOR ALUMINUM EXTRUSIONS
James H. Heywood, 1411 Doncaster, Youngstown, Ohio
Filed Jan. 17, 1964, Ser. No. 338,455
8 Claims. (Cl. 287—189.36)

This invention relates to a corner fastener or gusset and more particularly to a corner fastener or gusset as used for joining the corners of aluminum extrusions or rails to one another as, for example, in forming storm doors or the like.

The principal object of the invention is the provision of a corner fastener arranged to exert an expanding action in use to secure a pair of structural members to one another.

A further object of the invention is the provision of a corner fastener in which two mechanical actions are employed to secure the same in expanded fastening position in a pair of work pieces.

A still further object of the invention is the provision of a corner fastener which is simple in construction and capable of easy and economic manufacture.

A still further object of the invention is the provision of a corner fastener which utilizes metal screws to alter the relative position and shape of portions of the fastener so as to secure the same in the opposed ends of hollow aluminum extrusions or rails.

The corner fastener disclosed herein is particularly adapted for joining mitered ends of aluminum extrusions or rails to one another as in forming a frame such as in a metal storm door. It has heretofore been common in the art to utilize L-shaped fasteners which were simply wedged into the ends of the hollow aluminum extrusions or rails, and, in some instances, the metal of the extrusions or rails was distorted as by peening into areas of the corner fasteners in an effort to secure the same in desired position.

The present invention comprises a substantial improvement in the art in that a pair of stamped metal pieces are nested one partially within the other and in such assembly positioned in the ends of the metal shapes to be joined, whereupon metal screws are engaged through the nesting parts of the fastener to cause an expanding clamping action of the metal fastener parts relative to the structure in which they are positioned. The construction is such that an initial expanding action occurs when the metal screws seek to align themselves on a common axis as determined by preformed openings in the metal structure being fastened and the corner piece, and a second clamping action occurs when the metal screw causes distortion of the engaged portions of the corner pieces and thereby insures the extremely efficient fastening of the metal structure in desired relation.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention. The invention is illustrated in the accompanying drawing, wherein:

FIGURE 1 is a plan view of one portion of the corner fastener.

FIGURE 2 is a side view thereof.

FIGURE 3 is a plan view of the other portion of the corner fastener.

FIGURE 4 is a side view thereof.

FIGURE 5 is a top view of a portion of the corner formed with the corner fastener.

FIGURE 6 is a section on line 6—6 of FIGURE 5.

FIGURE 7 is a section similar to FIGURE 5 showing a first clamping action.

FIGURE 8 is a section similar to FIGURES 6 and 7 showing the second clamping action.

By referring to the drawings and FIGURES 1 and 2 in particular, it will be seen that one portion of the corner fastener comprises an L-shaped bridging body member 10 formed in right angularly disposed arms 11, each of which has a right angular longitudinally extending flange 12 the longitudinally extending flanges 12 being of a flattened V-shape configuration in transverse section as may readily be seen by observing the angular cut end portions of the arms 11 of the first portion 10. The outermost portions of the longitudinally extending transversely flattened V-shaped flanges 12 are provided with relatively large apertures 13 spaced longitudinally thereof for a purpose hereinafter explained.

By referring now to FIGURES 3 and 4 of the drawings, it will be seen that the second portion of the corner fastener comprises a secondary L-shaped bridging body member 14 having right angularly disposed arms 15 each of which is provided with longitudinally extending flanges 16 which are of greater height than said flanges 12. The secondary body member 14 also has a stabilizer tab 17 formed at the apex of the arms 15 and which tab is formed at right angles to the plane of the secondary body member 14 and extends at right angles and to a distance slightly greater than the height of the flanges 16 heretofore referred to. The flanges 16 are provided with relatively small apertures 18 in locations comparable with the locations of the relatively larger apertures 13, heretofore referred to, in the flanges 12 of the first mentioned portion.

The apertures 18 are located off-center with respect to an imaginary center line of each of the longitudinally extending flanges 16 as may be clearly seen by referring to FIGURE 4 of the drawings.

Still referring to FIGURE 4 of the drawings, it will be seen that the stabilizer tab 17 extends beyond the upper edges of the flanges 16 as hereinbefore described and includes a central extending portion 19. It will further be seen by referring to FIGURES 3 and 4 of the drawings that the stabilizer tab 17 is formed diagonally relative to either one of the arms 15, 15 of the second portion of the device.

By referring to FIGURE 5 of the drawings, it will be seen that a cross section taken through a hollow metal rail adjacent a mitered end thereof where it joins a similar hollow metal rail is illustrated with the corner fastener in position therein. The hollow extrusion through which the section is taken is indicated by the numeral 20 and the hollow metal rail to which it is attached by the corner fastener is seen in side elevation and is indicated by the numeral 21.

It will be understood that there is a mitered corner between the two rails 20 and 21 and that the corner fastener comprising the two parts, including the arms 11 and 15, are disposed therein. The first portion having the arms 11 is positioned with the arms in lowermost position and the flanges 12 upstanding relative thereto. The second portion 14 is positioned in vertical relation with the arms 15 in the uppermost portions of the hollow rails 20 and 21 with the angular flanges 16 depending therefrom.

It will be observed that one of the off-center apertures 18 in one of the flanges 16 is illustrated in FIGURE 6 of the drawings, and it will be seen that it is off center with respect to a centered opening 22 in the outer wall 23 of the hollow rails 20. A metal screw 24 is shown in position about to be driven through the opening 22 in the wall 23 of the wall 20 so that it will pass through the large aperture 13 in the flattened V-shape flange 12 of the one portion of the corner fastener and its tapered end engages the small aperture 18 in the flange 16 of the other portion of the corner fastener.

By referring now to FIGURE 7 of the drawings, the first clamping action that occurs as a result of the engagement of the metal screw 24 may be seen, and this is the movement upwardly of the flange 16 as the metal screw 24 is turned inwardly thereof and it attempts to follow a common center line. This first action spreads the two pieces 10 and 14 of the corner piece relative to one another bringing the respective arms 11 and 15 into pressure contact with the upper and lower walls of the walls 20 and 21.

It will be understood that there are preferably two metal screws 24 engaged in openings in each of the walls 20 and 21 arranged to correspond with the apertures 13 as seen in the first portion of the corner piece in FIGURE 1 of the drawings.

Still referring to FIGURE 7 of the drawings, it will be seen that the angular flange 16 has been moved into engagement with a portion of the transversely flattened V-shape flange 12 as the centering action of the metal screw 24 takes place. The relative expansion obtained is clearly illustrated when FIGURES 6 and 7 are compared and the relative positions of the arms 11 and 15 are compared. As the metal screw 24 is tightened further, the action illustrated in FIGURE 8 of the drawings occurs. The flange 16 continues to move toward the end wall 23 and must therefore move the transversely flattened V-shape flange 12. The outer longitudinal edge of the flange 12 is tightly caged between the flange 16 and the inner surface of the end wall 23 and the outer (lower) edge of the flange 16 moves along the arm 11 to increase the leverage acting to move the respective portions of the corner fastener away from one another and into very secure contact with the opposite inner walls of the metal walls against which they are engaged.

It will be observed that during initial installation and until such time as the dual clamping action, just described, occurs, the stabilizing tab 17 holds the respective portions of the corner fastener in oppositely disposed relation. It will thus be seen that when the plurality of metal screws 24 have been engaged, at least one in each of the flanges of the corner fastener, the device becomes permanently attached to and an effective part of the metal walls which are thereby held in desired connection. The dual action of the movable flanges 12 and 16 of the corner fastener contribute to the rigidity of the corner structure thus formed. The parts 10 and 14 of the corner fastener are preferably formed of steel stampings which enable the hereinbefore described expanding and clamping action to efficiently secure and hold the aluminum walls which are customarily employed in storm door constructions.

It will occur to those skilled in the art that the corner fastener may be used in securing hollow walls to one another and that it is equally effective in securing hollow or channel-shaped rolled sections to one another.

It will thus be seen that a corner fastener or gusset meeting the several objects of my invention has been disclosed, and having thus described my invention, what I claim is:

1. A corner construction comprising mitered hollow metal rails having opposed wall portions, a corner fastener for securing said mitered hollow metal rails to one another, said fastener comprising a pair of flat generally L-shaped body members each of which has longitudinally extending angularly disposed flanges on its outermost edges, the flanges on one of said L-shaped body members having apertures therein and the flanges on the other of said L-shaped body members having relatively small apertures therein positioned off center with respect to the center lines of said flanges, said L-shaped body members being arranged in oppositely disposed relation with said flanges in abutting relation and said apertures in adjacent offset relation to one another, and metal screws positioned through said metal rails and engaging one of the walls formed by said apertures in the flanges on one of said L-shaped body members and the walls of said apertures in said flanges on the other of said body members so as to move said flanges and said L-shaped body members relative to one another in the same plane and toward said respective wall portions of the rails whereby said flat L-shaped body members move apart and against said wall portions.

2. The corner fastener set forth in claim 1 and wherein one of said L-shaped body members has a right angular stabilizing tab adjacent the apex thereof arranged to position said L-shaped body member in oppositely disposed spaced relation.

3. The corner fastener set forth in claim 1 wherein the flanges on one of said L-shaped body members are of a flattened V-shape in cross section.

4. A corner construction for metal structures comprising right-angular disposed hollow rails having mitered ends abutting together and front, back and outer walls; a pair of L-shaped bridging members received in said hollow rails bridging said abutting ends and holding them together; each of said bridging members having planar right angularly disposed arms with longitudinally extending flanges extending inwardly thereof and at an acute angle thereto; the said bridging members being arranged in said hollow rails with the corresponding arms in opposed relation and the corresponding flanges in overlapping relation, said overlapping flanges overlying the respective outer wall of said corner construction and means securing said overlapping flanges together and to said respective outer wall of said corner construction whereby said arms of the bridging members are forced against said front and back walls.

5. The combination set forth in claim 4, wherein a stabilizer tab is carried by one of said L-shaped bridging members, said tab extending from said member at the juncture of its arms and at right angles thereto, and means on the free end of said tab contacting the arms of the other L-shaped member adjacent their juncture.

6. The combination set forth in claim 4, wherein the flange of one of said L-shaped bridging members is longitudinally bent at an obtuse angle and providing a planar portion, said planar portion face contact the corresponding flange on the other L-shaped bridging member.

7. A corner fastener comprising a pair of metal bridging members each of which is L-shaped in top plan view, each of said bridging members having right angular disposed planar arms, each of said arms having flanges along their outer longitudinal edges, each of said flanges making an acute angle with its respective arm, the flanges of one of said bridging members being longitudinally bent outward to an obtuse angle spaced from said acute angle and providing a planar portion which makes with an adjacent arm of the other bridging member an angle which is like said acute angle and thereby placing said planar portion parallel to the adjacent corresponding flange of the other arm when said pair of bridging members are assembled in operative relation and said flanges having apertures which are of different size and which have their centers off center and through which metal screws may be positioned for moving said flanges relative to one another.

8. The corner fastener set forth in claim 7 and wherein one of said L-shaped bridging members has a right angular stabilizing tab adjacent the apex thereof arranged to position and hold said L-shaped bridging members in oppositely disposed relation.

References Cited by the Examiner
UNITED STATES PATENTS 2,661,822  12/1953  Wisok _____ 189—76

HARRISON R. MOSELEY, *Primary Examiner.*

CHARLES E. O'CONNELL, *Examiner.*

L. R. RADANOVIC, P. M. CAUN, *Assistant Examiners.*